US012663783B2

(12) United States Patent
Abukwaik et al.

(10) Patent No.: US 12,663,783 B2
(45) Date of Patent: Jun. 23, 2026

(54) SAFETY INTERLOCK RECOMMENDATION SYSTEM

(71) Applicant: ABB Schweiz AG, Baden (CH)

(72) Inventors: Hadil Abukwaik, Weinheim (DE);
Heiko Koziolek, Karlsruhe (DE);
Alejandro Carrasco, Buenos Aires
(AR)

(73) Assignee: ABB Schweiz AG, Baden (CH)

( * ) Notice: Subject to any disclaimer, the term of this
patent is extended or adjusted under 35
U.S.C. 154(b) by 594 days.

(21) Appl. No.: 18/186,411

(22) Filed: Mar. 20, 2023

(65) Prior Publication Data

US 2023/0229144 A1 Jul. 20, 2023

Related U.S. Application Data

(63) Continuation of application No.
PCT/EP2021/075192, filed on Sep. 14, 2021.

(30) Foreign Application Priority Data

Sep. 21, 2020 (EP) ..................................... 20197264

(51) Int. Cl.
$G05B\ 19/00$ (2006.01)
$G05B\ 19/418$ (2006.01)
$G06F\ 11/07$ (2006.01)

(52) U.S. Cl.
CPC ..... G05B 19/4184 (2013.01); G05B 19/4185
(2013.01); G06F 11/079 (2013.01)

(58) Field of Classification Search
None
See application file for complete search history.

(56) References Cited

U.S. PATENT DOCUMENTS

| | | | |
|---|---|---|---|
| 9,092,802 B1 | 7/2015 | Akella | |
| 10,031,510 B2 * | 7/2018 | Zhao ...................... | G05B 17/02 |
| 2015/0148919 A1 * | 5/2015 | Watson .................. | G06N 5/043 |
| | | | 700/31 |

(Continued)

OTHER PUBLICATIONS

European Patent Office, International Search Report in International
Patent Application No. PCT/EP2021/075192, 5 pp. (Nov. 30, 2021).

(Continued)

*Primary Examiner* — Paul B Yanchus, III
(74) *Attorney, Agent, or Firm* — Fitch Even Tabin &
Flannery LLP

(57) ABSTRACT

A safety interlock recommendation system includes at least
one process data source, an edge device, wherein the process
data source is configured for providing IOS device stream
data to the edge device; wherein the edge device comprises
an operational technology edge application unit, OT edge
application unit, and a stream analysis unit; wherein the OT
edge application unit is configured for providing operation
technology stream data, OT stream data; wherein the stream
analysis unit comprises an online machine learning model,
being configured for determining online analysis data using
the provided process stream data and the provided OT
stream data; wherein the OT edge application unit is con-
figured for determining a short-term recommendation using
the online analysis data.

14 Claims, 3 Drawing Sheets

(56)             References Cited

U.S. PATENT DOCUMENTS

| | | | |
|---|---|---|---|
| 2016/0320768 A1 | 11/2016 | Zhao et al. | |
| 2018/0284741 A1 | 10/2018 | Cella et al. | |
| 2019/0064787 A1* | 2/2019 | Maturana ........... | G05B 23/0227 |
| 2019/0324437 A1 | 10/2019 | Cella et al. | |
| 2021/0191365 A1* | 6/2021 | Kadam .............. | G05B 13/0265 |

OTHER PUBLICATIONS

European Patent Office, Written Opinion in International Patent Application No. PCT/EP2021/075192, 9 pp. (Nov. 30, 2021).
English Translation of Office Action mailed Dec. 3, 2025 in Chinese Application No. 2021800549089, 11 pages.

\* cited by examiner

SAFETY INTERLOCK RECOMMENDATION SYSTEM

CROSS-REFERENCE TO RELATED APPLICATIONS

This patent application claims priority to International Patent Application No. PCT/EP2021/075192, filed on Sep. 14, 2021, and to European Patent Application No. 20197264.3, filed on Sep. 21, 2020, each of which is incorporated herein in its entirety by reference.

FIELD OF THE DISCLOSURE

The present disclosure relates to a safety interlock recommendation system and a method for controlling such a system.

BACKGROUND OF THE INVENTION

Most safety interlock logic is designed as a reactive rather than proactive management of unwanted situations. Such an approach waits for unwanted situation, for example specified as causes in a Cause&Effect matrix, C&E, and handles them afterwards, for example, specified as effects in C&E matrix, instead of taking actions to prevent them from happening at all. Moreover, the human operators are not directed to monitor potential of upcoming interlocks, but rather to manage alarms caused by discrete values reaching predefined thresholds and act upon them. Hence, human operators are geared to handle events when they actually happen. This reactive manner leads to workflow disruptions and eventual losses either in the form of plant, plant area, or equipment stops or, in a more critical form, as property damages, environmental impacts, or even human injuries. Consequently, the process loses productivity for maintenance and repairs.

The reactive style of managing the interlocking situations starts at the definitive analysis of beforehand determined elements in the interlocking logic, for example with a C&E matrix. Limiting the management to the reactive style prevents potential improvements through exploration and continuous learning from existing data of the processes and their interlocks. Applying manual effort to comprehensively cover all alternative factors and their combinations using traditional engineering methods and human analysis is complex. This complexity increases for the constantly growing number of variables in large plants and processes. This may also result in correlation between process causes and effects that were considered to be independent during interlocking system design and whose real life interaction is hard to infer without a system that aids in the analysis of large amounts process data.

Add to this, the knowledge on manually-taken decisions by experts in reaction to specific interlocking situations, for example adapting thresholds of high-high level of a vessel, is lost if not well-documented. Even if such decisions and their rationale are documented, it is seen as expensive investment to benefit from them, as it is still hard to retrieve and reuse them efficiently. This loss of accumulative lessons-learned complicates reaching mature and stable safety-sensitive processes through continuous improvements.

BRIEF SUMMARY OF THE INVENTION

In view of the prior art, it would be advantageous to have an improved technique for industrial process data source replacement.

In a first aspect, the present disclosure provides a safety interlock recommendation system, comprising at least one process data source and an edge device. The Process data source is configured for providing process stream data to the edge device. The edge device comprises an operational technology edge application unit, OT edge application unit, and a stream analysis unit. The OT edge application unit is configured for providing operation technology stream data, OT stream data. The stream analysis unit comprises an online machine learning model, being configured for determining online analysis data using the provided process stream data and the provided OT stream data. The OT edge application unit is configured for determining a short-term recommendation using the online analysis data.

BRIEF DESCRIPTION OF THE SEVERAL VIEWS OF THE DRAWING(S)

DETAILED DESCRIPTION OF THE INVENTION

Figure 1:
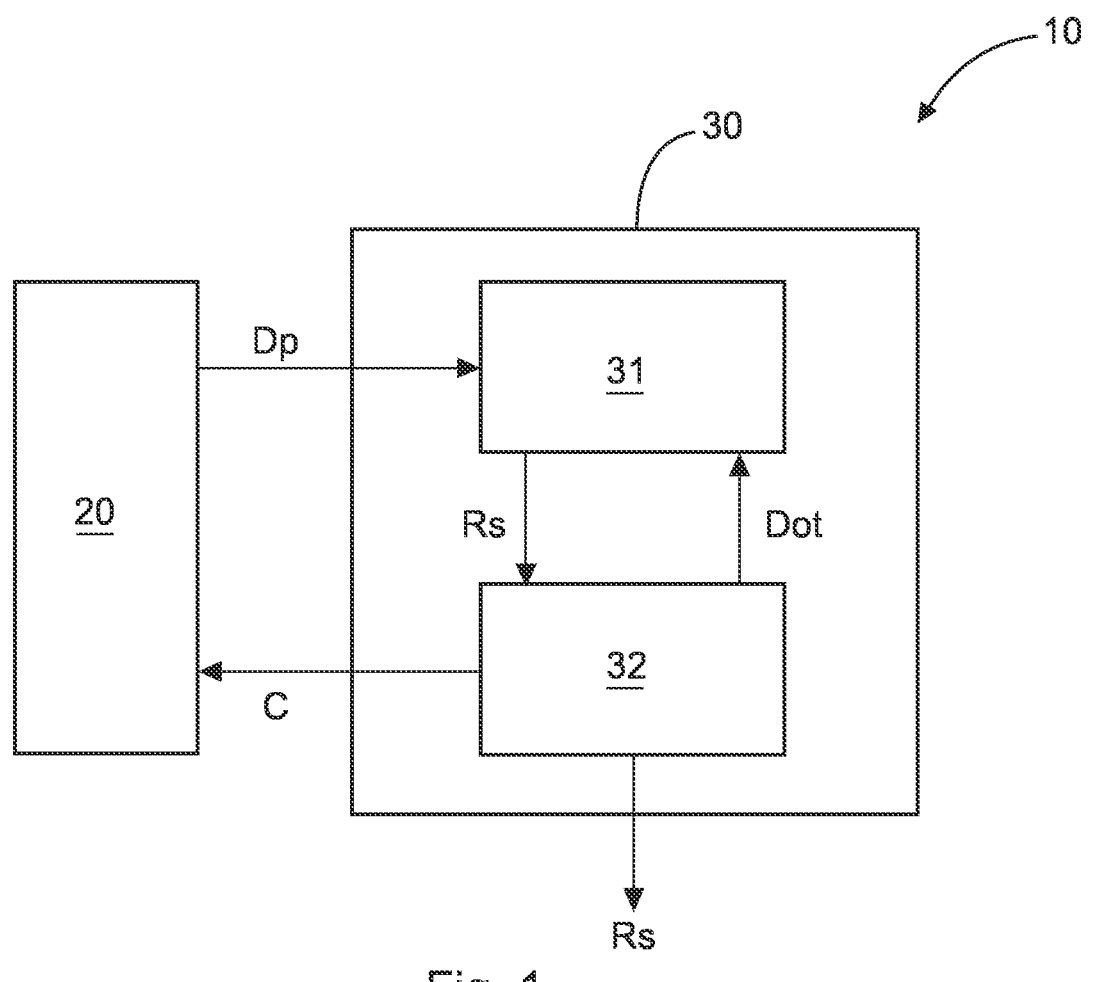
FIG. 1 is a block diagram of a safety interlock recommendation system in accordance with the disclosure.

FIG. 1 describes a safety interlock recommendation system 10, comprising a plurality of process data sources 20 and an edge device 30. The plurality of edge devices comprises sensors, actuators, controllers, whose process relevant data may be grouped under one or more control system platforms, and an input interface, in particular a manual input interface. The process data sources 20 are configured for providing process stream data Dp to the edge device 30. The edge device 30 comprises an operational technology unit 31, OT unit, and a stream analysis unit 32. The OT edge application unit 31 is configured for providing operation technology stream data, OT stream data Dot. The stream analysis unit 32 comprises an online machine learning model, being configured for determining online analysis data Daon using the provided process stream data Dp and the provided OT stream data Dot. The OT edge application unit 31 is configured for determining a short-term recommendation Rs using the online analysis data Daon. The OT edge application unit 31 furthermore is configured for providing the process data sources 20 with operational indications C, for improved control of the process data sources 20, in particular using the short-term recommendation Rs.

Figure 2:
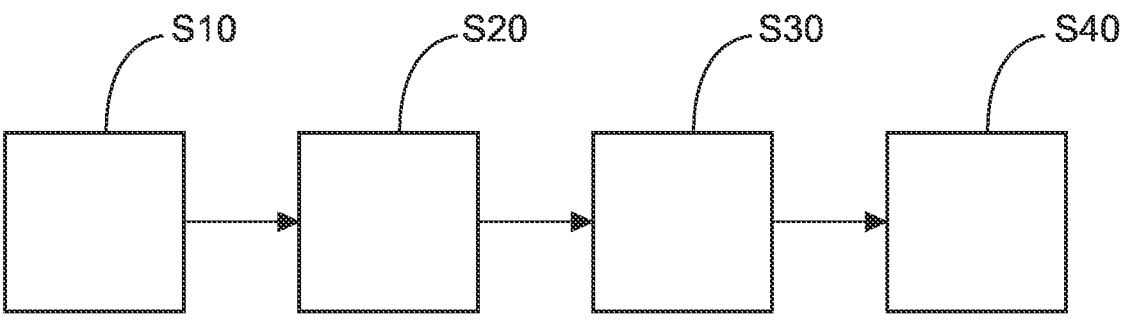
FIG. 2 is a flowchart for a method for recommending a safety interlock in accordance with the disclosure.

FIG. 2 describes a method for recommending a safety interlock, comprising the following steps. In a first step S10, process stream data Dp is provided by a process data source 20 to an edge device 30. The edge device 30 comprises an operational technology edge application unit 31, OT edge application unit, and a stream analysis unit 32. In a second step S20, operation technology stream data, OT stream data is provided by the OT edge application unit 31. In third step S30, an explorative analysis is executed by an online machine learning model of the stream analysis unit 32, using the provided stream data and the provided OT data by executing an explorative analysis, thereby determining online analysis data Daon. In a fourth step S40, a short-term recommendation Rs is determined using the online analysis data Daon.

Figures 3, 4:
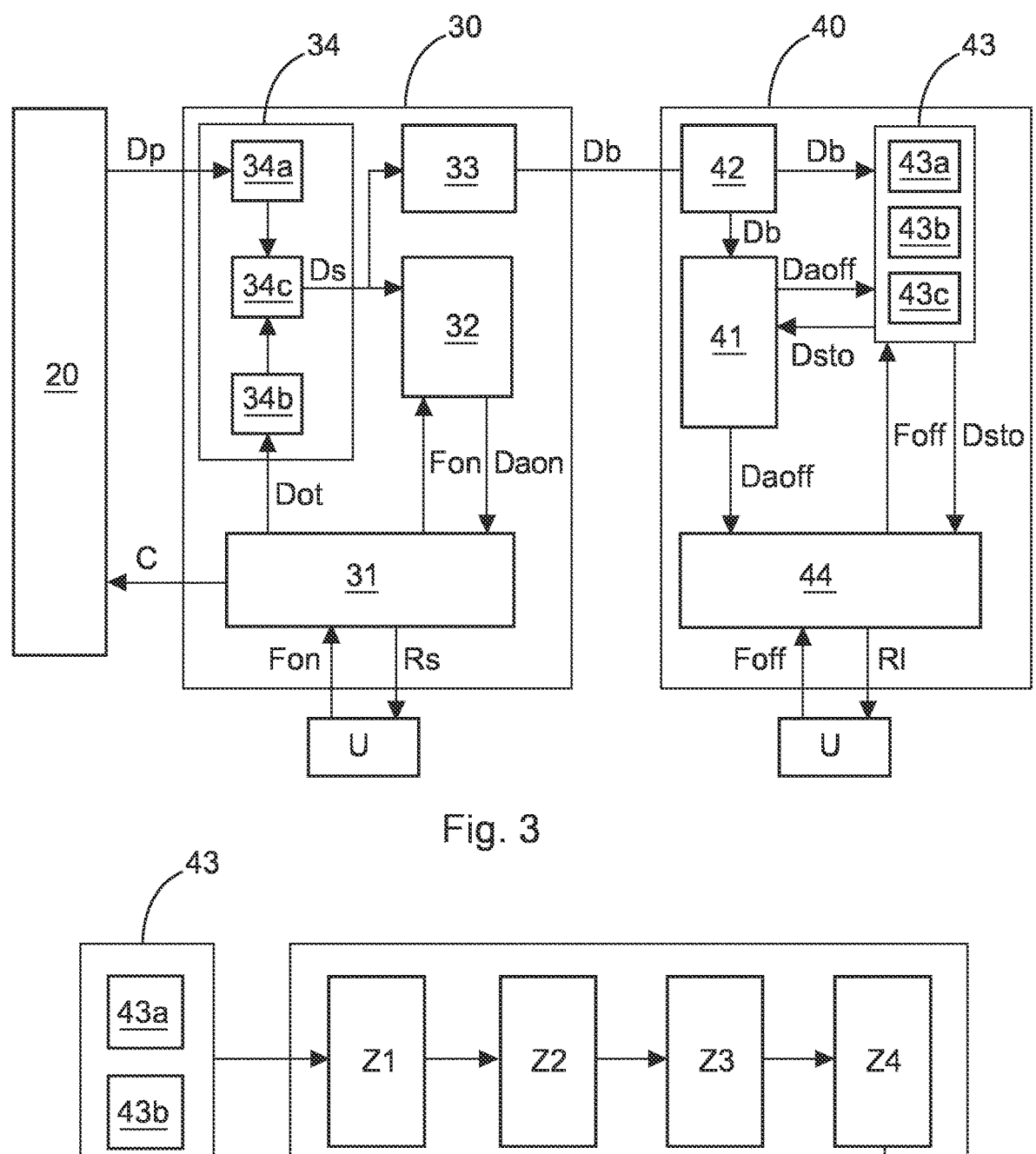
FIG. 3 is a block diagram of a safety interlock recommendation system in accordance with the disclosure.
FIG. 4 is a diagram of a process of preparing the machine learning models for the safety interlock recommendation system in accordance with the disclosure.

FIG. 3. shows another embodiment of the safety interlock recommendation system of FIG. 1 in a more detailed view. The edge device 30 comprises an OT edge application unit 31, a stream analysis unit 32, an edge device storage 33 and an edge device data manager 34. The edge device data manger 34 comprises an ingestion unit 34a, an enrichment unit 34b and a processing unit 34c. The safety interlock recommendation system 10 also comprises a cloud platform 40. The cloud platform 40 comprises a batch analysis unit 41, a data hub 42, a cloud storage 43 and a cloud application unit 44. The cloud storage 43 comprises an information technology storage 43a, IT storage, an operational technology storage 43b, OT storage, and a recommendation storage 43c.

The process data source 20 provide process stream data Dp, being real-time dynamic time-series data that is directly related to the controlled process that the process data source 20 executes. The process stream data Dp for example comprises an equipment temperature, a pressure, a flow speed and/or an off/on status. The process stream data Dp is continuously collected data from different levels of the industrial plant, in particular an industrial safety system comprising the safety interlock recommendation system, namely, a process control layer, i.e., including process alarms and control data, a safety prevention layer with its shutdown systems, i.e., including safety trips and interlocks data, and a mitigation layer with its emergency responses, i.e., including consequence reduction via de-pressuring, relief valves, and fire and gas data. Furthermore, the process data source 20 comprises an input interface providing an option for the user, in particular a human operator or a safety interlock engineer, to manually enter other safety-related input channels, e.g., information on the rupture disc status. Also, an option for the user U is provided to manually enter and edit information fields or even complete events, to handle missing data or hard to automatically collect data, e.g., resolution date and time.

The wider the spectrum of collected data elements related to the process safety, the more accurate results and insights can get through to the stream analysis unit 32 or the batch analysis unit 41 and their respective online and offline machine learning models.

The process stream data Dp is provided to the edge device data manager 34. In addition, the edge device data manager 34 is provided with operation technology stream data Dot, OT stream data. The OT stream data Dot comprises real-time data relating to process controls or alarms of the industrial plant and thus the executed control process itself. The enrichment unit 34c processes the OT stream data Dot and the ingestion unit 34a processes the process stream data Dp. Both outputs are used by the processing unit 34c to determine stream data Ds based on the OT stream data Dot and the process stream data Dp. The stream data Ds in other words relate to the process stream data Dp enriched by the OT stream data Dot. The stream data Ds is provided to the edge device storage 33 for collecting the real-time data of the stream data Ds over a longer time frame. The stream data Ds is also provided to the stream analysis unit 32. The stream analysis unit 32 comprise an online machine learning model, also referred to as interlock stream operational recommender. The online machine learning model determines online analysis data Daon using the provided stream data Ds. In other words, the machine learning model provides machine learning insights relating to the safety interlock. Those online analysis data Daon is provided to the OT edge application unit 31, where it is used to determine a short-term recommendation Rs, in particular by a safety interlock application comprising a real-time monitor and control unit and a real-time interlock operational recommender. The short-term recommendation Rs Is provided to a user U for evaluation. The user U provides online feedback Fon, which is stored in the edge device storage 33 together with the stream data Ds. Also, the stream analysis unit 32 uses the online feedback Fon together with the stream data Ds to determine the online analysis data Daon.

The online feedback Fon allows the user U, in particular a human expert, to respond to the machine learning-based short-term recommendations Rs of the system 10 being either accepting, editing, or rejecting them. This also applies to the long term operational recommendations R1 or re-engineering recommendation Re of the cloud platform 40. As some input elements are in the form of natural language text, e.g., interlock incident report, it is needed to process them using some Natural Language Processing, NLP, techniques with a predefined taxonomy of interlocking causes and effects, e.g., list of plant interlocking effects includes pump shut down, tank over flow, etc. and list of interlocking causes includes pipe clog, motor temperature, etc. Thus, the NLP analyzes textual input trying to identify any cause or effect elements that enrich the data passed to the recommender model.

The safety interlock recommendation system 10 also allows for vendor-independent input data. For example, it is able to collect the targeted data even if the process uses ABB 800xa control system and a Safety Instrumented System, SIS, from any vendor that could be improve the safety through diversity. Thus, a classic OPC server to collect data from the various systems, as it is done with Advanced Process Control, APC, solutions is provided.

The data hub 42 of the cloud platform 40 receives batch data Db from the edge device storage 33. The batch data Db comprise collected stream data Ds, online feedback Fon and online analysis data Daon. This batch data Db is provided by the data hub 42 to the cloud storage 43 and the batch analysis unit 41. The batch analysis unit 41 comprises at least one offline machine learning model providing offline analysis data Daoff using the batch data Db. In this case, the batch analysis unit 41 comprises two offline machine learning models, referred to as an interlock batch operational recommender and an interlock batch re-engineering recommender. The interlock batch operational recommender determines offline analysis data Daoff relating to the operation of the industrial plant. Based on this offline analysis data Daoff, the cloud application unit 44, in particular an interlock operational recommender, provides a long-term operational recommendation R1 to a user U. The interlock batch re-engineering recommender determines offline analysis data Daoff relating to the interlock design itself. Based on this offline analysis data Daoff, the cloud application unit 44, in particular an interlock engineering recommender, provides a re-engineering recommendation Re to the user U. In line with the user feedback of the edge device 30, the cloud application unit 44 is configured for receiving offline feedback Foff from a user U, being a human operator or a safety interlock engineer. The offline feedback Foff may relate to the long-term operational recommendation R1 or the re-engineering recommendation Re. The offline feedback Foff is provided to the cloud storage 43, from where it is stored and redistributed to the batch analysis unit 41. The batch analysis unit 41 uses the offline feedback Foff for determining the offline analysis data Doff. The offline analysis data Doff is also provided to the cloud storage 43 for further processing. The cloud storage 43 comprises an IT storage 43*a* storing data relating to interlock designs, for example a cause and effect matrix, and input-output-list data, defining the inputs and outputs of at least parts of industrial plant components. Also, the cloud storage 43 comprises an OT storage 43*b* storing data relating to operational data, safety interlock incidents and alarm events. The cloud storage 43 comprises a recommendation storage 43*c* storing data relating to an operational recommender log, tracking former long-term operational recommendations, and a re-engineering recommender log, tracking former re-engineering recommendations.

In other words, the cloud storage 43 is a static safety interlock log database, which is the history records of previous interlocking situations of a plant, e.g., interlock start date and time, interlock resolution date and time, parent plant and process, process data, original interlock cause according to C&E matrix, related root cause and proactive recommendation given by the ML-based system, interlock effect severity on a predefined scale and effect/maintenance time period.

For the Interlock operational recommenders, in particular real-time interlock operational recommender and interlock operational recommender, it returns timely accurate predictions for the user U on approaching a safety interlocking event. Unlike the manually configured alarm system that produces interlocking alerts based on monitoring predefined measures, those prediction of interlock events is based on explorative analysis of wider space of operational input data elements and their associations. The short-term recommendation Rs and the long-term operational recommendation R1 complements the output of the alarm system with unseen prediction. Calculating the approachability of an event depends on its nature. For example, the approachability of events with categorical values like altering the binary state of a safety valve, i.e., either open or close, is a pure time value, e.g., Safety-valve X closes in 20 minutes. However, the approachability of interlocking events with numerical values like a spillage state of a vessel, e.g., Reactor Y high level=%90, is calculated as a non-linear formula, it could be logarithmic as the approachability of safety-critical spillage would increase at a faster pace as you get close to the threshold value. Along with the approachability information, the safety interlock recommendation system 10 provides proactive recommendations for the user U to drive away from the undesired process downtime effect. The recommended actions to alleviate the situation are based on the root cause analysis performed automatically by the system.

The interlock batch re-engineering recommender returns recommendations for a user, in particular a safety interlock designer, to improve the interlocking design based on long-term observation for patterns among the detected root causes, safety interlock incidents, interlock design, etc. It could also raise associations' findings between safety interlock incidents and human-related factors in the incidents record like the logged operator and the time an interlock occurred, e.g., lunch time, night shifts, between shift changes, holiday season, etc. That is, the smart system analysis exhausts every possible input data, not only process-related ones.

Another considered output of the safety interlock recommendation system 10 is the knowledge base of the cloud storage 43 created by the acquisition of human operators' knowledge taken from their responses to the ML recommendations, i.e., accept, reject, or edit, on both the operational and engineering levels. This acquired knowledge is then re-used to re-learn the offline machine learning model and the online machine learning model and improve their performance.

The outputs could be presented within a safety dashboard or even integrated with the regular alarm management system that is displayed in control rooms on big screens or/and on mobile apps to allow user mobility. A collection of operator actions against raised predictions and recommendations is then be simply logged and later analyzed as a batch. The dashboard offers several useful features including the following: Present continuous Process Safety status through tracking the safety interlocks or selected subset of them over their past, current, and ML-predicted future states. It could also be considered as an extension of the 800xA Interlock Viewer. Measure and continuously present an overall Process Safety KPI that is a quantitative measure defined by the safety experts, e.g., it could be a formula based on the frequency of approaching safety interlocks over a specific period and their cost. Measure the cost of triggered safety interlocks in terms of the amount of time the workflow was shut down or disrupted and not operating at maximum production capacity. This could be presented as an overall cost trend of all safety interlocks or as single cost trend per selected interlock over a selected period. It could also be presented along with the information on how the smart system helped you improve that by reducing such cost over time. Generate warning regarding sharply unexpected behavior of specific interlock. This requires default configuration based on some benchmarking or manual configuration by user. For example, the user decides the frequency threshold for raising a warning on an interlock that is triggering more frequently than predicted. Even better, customized warning can be created by the user based on domain experience. As the intelligent system could predict the approachability of several interlocks at similar or close operational times, it should order them with a priority rate based on the interlock effect severity or the effort required to avoid them. Similar feature should be offered for the interlock re-engineering recommendations too. Support generating periodic reports of all analyzed information, dashboards, interlock states, etc. The user should also be able to customize the reports and the way to automatically store them either in a server or/and send them via email.

FIG. 4 describes the overall process of preparing the machine learning model for the safety interlock recommendation system 10 being the operational component or the re-engineering component. The process is continuous as it trains the machine learning models, uses the model in production, and goes into a re-trains cycle to benefit from the newly collected data, both the model predictions and recommendations and the human operator feedback on them.

Before putting the safety interlock recommendation system 10 in execution, the machine learning models need to be trained. For the online machine learning model, an unsupervised machine learning algorithm, e.g., Bayesian Networks, gets trained on the available records of the IT storage 43*a* and the OT storage 43*b*. The trained algorithm produces a model that gets evaluated, tested, packaged, and finally deployed on its intended host being the edge or the cloud. It is important to validate the resulted model by a human domain expert who judges the correctness of the model in identifying approaching interlocking situations and in recommending actions. The training data records may come from former projects or currently running installations. To build the offline machine learning model for interlock batch re-engineering recommender, the same process is repeated, but with further data input which is from the recommendation storage 43*c*. That includes the overtime feedback from the human on the re-engineering recommendation Re. The frequency of re-training the models is determined based on the monitored frequency of recommendations and feedback given back to the system.

In other words, FIG. 4 shows the data storage 43. Based on the IT storage 43*a* and the OT storage 43*b*, in steps Z1-Z4, a pre-production workflow of the safety interlock recommendation system 10 is executed. In a step Z1, the data is prepared, in another step Z2, the online machine learning model and the offline machine learning model is trained. In another step Z3, the machine learning models are tested. In another step Z4, the machine learning models are packaged an deployed. Subsequently an in-production workflow of the safety interlock recommendation system 10 is shown with the steps Z5-Z7. In a step Z5, the online machine learning model and the offline machine learning model provides online analysis data Daon and offline analysis data Daoff base on online data, in particular stream data Ds In s step Z6, short-term recommendations Rs and long-term operational recommendations R1 are provided based on the online analysis data Daon and the offline analysis data Daoff. In a step Z7, online feedback Fon and offline feedback Foff is determined using the short-term recommendations Rs and long-term operational recommendations R1. This information is then stored into the recommendation storage 43*c* of the cloud storage 43.

Figure 5:
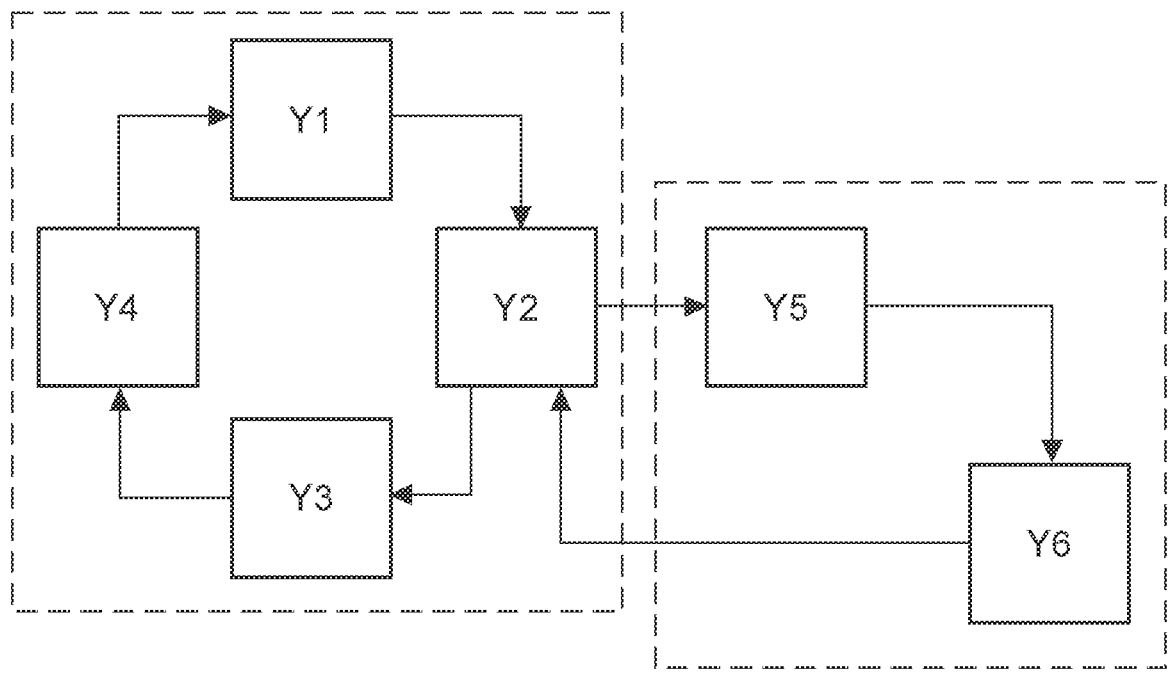
FIG. 5 is a flowchart for an alternative embodiment of a method for recommending a safety interlock in accordance with the disclosure.

FIG. 5 shows both the operational and engineering workflow of the safety interlock recommendation system 10. In a step Y1, process-safety related measures are continuous collected and monitoring. In a step Y2, the collected records get automatically analyzed by the online machine learning model, in particular the short-term recommender model, to compute the approachability of an interlocking situation. In a step Y3, once a specific interlock gets approaching, the recommender system suggests the operator taking a proactive action on the identified root cause to reverse its negative effect back. In a step Y4, the human expert, i.e., human operator, assesses the recommendation an decides whether to accept it or reject it. The made decision gets logged in a database to be used later in enhancing the online machine learning model performance. The steps from Y1 to Y4 keep repeating. In a step Y5, the log database of the system interlocks gets automatically and continuously analyzed by the offline machine learning model, in particular by the interlock batch re-engineering recommender to capture associations for recurring interlocking situations. This is used for auto comparison between the detected root causes and the causes captured in the existing interlocking design, e.g., cause and effect C&E matrix, of the system. The interlock batch re-engineering recommender suggests accordingly tuning/adapting the existing interlock design. In a step Y6, the human expert, i.e., safety interlock designer, assesses the re-engineering recommendation Re and decides whether to accept it or reject it. As in step Y4, the made decision gets also logged for later enhancing the offline machine learning model performance.

REFERENCE SIGNS

10 safety interlock recommendation system
20 process data source
30 edge device
31 OT edge application unit
32 stream analysis unit
33 edge device storage

34 edge device data manager
34*a* ingestion unit
34*b* enrichment unit
34*c* processing unit
40 cloud platform
41 batch analysis unit
42 data hub
43 cloud storage
43*a* IT storage
43*b* OT storage
43*c* recommendation storage
44 cloud application unit
Dp process stream data
Rs short-term recommendation
R1 long-term operational recommendation
Re re-engineering recommendation
C operational indication
Dot operation technology stream data
Db batch data
Ds stream data
Dsto storage data
Daon online analysis data
Daoff offline analysis data
Fon online feedback
Foff offline feedback
U user
S10 providing stream data to an edge device
S20 providing operation technology stream data
S30 executing an explorative analysis thereby determining online analysis data
S40 determining a short-term recommendation
Z1 preparing data
Z2 training the machine learning model
Z3 testing machine learning model
Z4 packaging and deployment
Z5 providing analysis data
Z6 provide recommendation
Z7 determine feedback
Y1 collecting and monitoring process-safety related measures
Y2 analyzing the collected records
Y3 suggesting proactive action
Y4 accept or reject operational recommendation
Y5 analyzing database
Y6 accept or reject engineering recommendation In one embodiment, the stream analysis unit is configured for determining the short-term recommendation in real-time.

The explorative analysis may reveal interlock indicators, comprising early signs of a potential safety interlock event, an actual root cause for the potential safety interlock event and/or contributing causal factors of unwanted situations, which may lead to a potential safety interlock event. The interlock indicator is not captured by using a known constrained alarm system and its predefined measures and thresholds. For example, a traditional constrained monitoring for a vessel overflow is done by a restricted monitoring for a predefined High-Level alarm, for example 70% fill of the vessel, that precedes the HighHigh-Level alarm, for example 90% fill of the vessel. The explorative analysis allows for determining interlock indicators, in this case early signs of the overflow. The interlock indicator comprises an observed pattern of co-changes within the stream data, in particular sensor data of the process data source. The observed pattern of co-changes in this case relates to level readings of the vessel with readings of other sensors like a pumping speed or a preceding pump, flow ratio of outlet pipes and/or valve opening percentage in a preceding section of the plant.

The short-term recommendation may be used for initiating proactive actions to avoid potential safety interlock events in the industrial plant.

The term "process data source", as used herein, comprises any source of process stream data, in particular field devices, like an internet of things device, IOT device, which may have their own intelligence to report data, and a traditional process data source, which may be connected to control system platforms.

The term "edge device", as used herein, refers to an on premise device that is able to collect data and perform quick on-site analysis, calculations, filtering and prepare data for uploading it to a higher level Tier, like a cloud, platform where storage, longer term and more complex calculations are performed. The edge device thus comprises an internet of things edge device, IOT edge device, or a classic distributed control system, DCS, in particular disconnected from the internet.

The term "process stream data", as used herein, comprise real-time operational data, in particular of a process data source or another edge device. The process stream data comprise real-time data provided by the process data sources.

The term "OT stream data", as used herein, comprises safety-relevant data from an operational technology application unit hosted on the edge device. The operational technology application unit preferably comprises an alarm system and a process control system. The OT stream data preferably comprises safety-relevant data from the operational application technology unit hosted on the edge device.

The operational technology unit preferably comprises OT edge applications. The OT edge applications relate to applications used for operating the process data sources and the OT edge device. The OT edge applications are preferably supervised or at least partly controlled by a user, which is a human operator. The OT edge applications preferably comprise a process control system, an alarm system and/or a safety interlock application. The process control system is configured for managing the executed processes, including providing operational indications for controlling the process data sources to the process data sources.

Preferably, the term "user", as used herein, comprises a human operator, in particular a human operator that operates in an industrial environment. For the example, the user relates to a human operator that handles an industrial process in an industrial plant.

The term "edge device", as used herein, relates to an edge computing device, being disposed close to the controlled process data sources allowing for low latency communication with the process data sources.

The online machine learning model is preferably referred to as interlock stream operational recommender. The online machine learning model is hosted in the edge device, which aims at short-term operational improvements by proactively identifying upcoming interlock situations and recommending the human operator actions to take, for example if a vessel is approaching a low-low level that would stop a pump and affect the downstream, consider increasing the flow speed on its inlet in a specific time period like in 10 minutes. The preferably pre-trained online machine learning model continuously explores the OT stream data and reacts in near-real-time. Having the edge device close to the controlled Process data sources, in particular along with using latent variable modelling, where discrete observations are correlated to a theoretical continuous known data curve that cannot be measured directly, allows low latency, which is important for time-critical safety situations.

The process data source may comprise at least one sensor, at least one actuator, at least one controller and/or at least one Manuel input interface, each configured for providing the stream data.

Preferably, the edge device provides continuous stream data processing with a low response time. This allows the determination of the real-time recommendation.

Consequently, the edge device allows for short-term operational improvements by proactively identifying upcoming interlock situations and recommending the user actions to take. For example, if a vessel is approaching a low-low level that would stop a pump and affect the downstream, the recommendation proposes to consider increasing the flow speed on its inlet in a specific time period like in 10 minutes.

Thus, the safety lock recommendation system allows for utilizing machine learning capabilities in supporting proactive management of safety interlocks for industrial processes. The proactive system is not meant to replace the original reactive approach, but rather to complement it with early recognition of the approachability of unwanted situations and how to handle them.

The provided safety interlock recommendation system allows for an effective safety operation of an industrial plant. For example, in case of an industrial plant of poorly-tuned instruments and loops causing frequent triggering of interlocks, the system proactively predicts operational issues and thoroughly analyzes them to find out the root causes.

The provided safety interlock recommendation system allows for an effective safety design. The system keeps an eye on the safety-related event and analyzes them to point out potential design improvement to reduce triggering the safety relevant interlocks.

The provided safety interlock recommendation system allows for assured safety. Even in plants with effectively operating loops and interlocks, our proposed solution could keep an eye on the safety status by continuously analyzing the plant event history and help avoid working too close to safety-critical conditions.

The provided safety interlock recommendation system allows for low cost. The cost of implementing this system into a product is relatively low as it requires no extra hardware and would run in parallel to a control system, collecting data and producing results without interfering with actual operation.

Consequently, an improved safety interlock recommendation system is provided.

In a preferred embodiment, the stream data comprises dynamic time-series data directly relating to a controlled process of the industrial plant In a preferred embodiment, the online machine learning model executes an online explorative analysis to determine the online analysis data. The online explorative analysis comprises association mining and root cause analysis.

In other words, the online machine learning model starts with association mining among the input elements and continues with root cause analysis based on which it outputs online recommendations for proactive actions to avoid potential safety interlock events.

In view of the vessel overflow example, explorative analysis allows for identifying early signs of the overflow as an observed pattern of co-changes happening to the targeted-vessel's level readings with readings of other sensors like a pumping speed of a preceding pump, flow ratio of outlet pipes, or/and valve-opening percentage in preceding sections of the plant.

Consequently, an improved safety interlock recommendation system is provided.

In a preferred embodiment, association mining comprises detecting operational patterns in the stream data, comprising the process stream data and the OT stream data, and wherein the root cause analysis comprises detecting a root cause in the stream data for a potential safety interlock event.

In a preferred embodiment, the interlock safety recommendation system comprises a cloud platform. The edge device is configured for determining batch data using stored stream data. The cloud platform comprises a batch analysis unit and a cloud application unit. The batch analysis unit comprises an offline machine learning model configured for determining offline analysis data using the batch data. The cloud application unit is configured for determining a long-term operational recommendation using the offline analysis data.

The term "batch data", as used herein, comprises OT stream data and process stream data that are collected over time. Consequently, further processing of the batch data does result in a non-real time analysis.

Preferably, the long-term operational recommendation is also referred to as non-real time operational recommendations, as the long-term operational recommendation compared to the short-term recommendation is not determined based on real-time data, but on batched data.

Preferably, the cloud platform provides periodic processing of the batch data with high accuracy. This allows for long-term operational recommendation, in particular operational recommendation and/or engineering recommendation. The long-term operational recommendation preferably is referred to as non-real-time operational recommendation.

Although the edge device has a timing advantage over the cloud platform, compared to the cloud platform, the edge device has limited processing power and data storage capabilities.

Consequently, the edge device and the cloud platform provide a combination of stream data processing and batch data processing.

Preferably, the results of the edge device and cloud platform are presented to the human operator and interlocks engineer through interactive applications and web services.

Thus, the safety interlock recommendation system provides a hybrid processing technique, in which combine stream data processing is combined with batch data processing. On one hand, the edge device offers continuous stream data processing with high response time, which is important for real-time operational recommendations. On the other hand, the cloud platform offers periodic batch processing with high accuracy, which is needed for longer-term operational and engineering recommendations.

Consequently, an improved safety interlock recommendation system is provided.

In a preferred embodiment, the offline machine learning model executes an offline explorative analysis to determine the offline analysis data. The offline explorative analysis comprises association mining and root cause analysis.

In a preferred embodiment, association mining comprises detecting operational patterns in the batch data and wherein the root cause analysis comprises detecting a root cause in the batch data for a potential safety interlock event.

Association mining comprises identifying patterns of reoccurring interlock alarms or incidents with inconsistency between their originally specified cause in the interlocking logic, for example a cause in a cause and effect matric, C&E matrix, and the machine learning-based identified root cause that has been accepted by the human operator.

Consequently, an improved safety interlock recommendation system is provided.

In a preferred embodiment, the cloud platform comprises a cloud storage. The cloud storage is configured for providing storage data to the batch analysis unit. The storage data comprises additional stored data relating to the safety interlock recommendation system. The offline machine learning model is configured for determining the offline analysis data using the provided storage data.

Preferably, the storage data comprises information technology storage data, IT storage data, operational technology storage data, OT storage data and safety interlock recommendation storage data. The IT storage data comprises interlock designs, for example a cause and effect matrix, and input-output-list data, defining the inputs and outputs of at least parts of industrial plant components. The OT storage data comprises operational data, safety interlock incidents and alarm events. The safety interlock recommendation storage data comprises an operational recommender log, tracking former long-term operational recommendations, and a re-engineering recommender log, tracking former re-engineering recommendations.

Consequently, an improved safety interlock recommendation system is provided.

In a preferred embodiment, the cloud application unit is configured for determining a re-engineering recommendation using the offline analysis data. The re-engineering recommendation comprises potential design enhancement for an existing interlocking logic.

Preferably, the interlocking logic comprises thresholds for the safety interlock recommendation system for activating a safety interlock event.

The re-engineering recommendation can be about tuning some safety threshold values, introducing new interlocks, or editing suboptimal interlock causes or effects, for example if a vessel overflow interlock is currently designed to monitor only the vessel level and to close the inlet valve as an effect, the re-engineering recommendation could recommend adding the preceding pump speed as an additional cause to monitor. Having this component on the cloud allows it to perform the heavy computations of the massive data existing in the cloud storage.

Preferably, the offline machine learning model comprises an interlock batch re-engineering recommender, hosted in the cloud, which aims at long-term engineering improvements by identifying potential design enhancement for the existing interlocking logic and recommending it to a user, in particular safety interlock engineer. The re-engineering recommendation preferably is about tuning some safety threshold values, introducing new interlocks, or editing suboptimal interlock causes or effects (e.g., if a vessel overflow interlock is currently designed to monitor only the vessel level and to close the inlet valve as an effect, the system could recommend adding the preceding pump speed as an additional cause to monitor). Having the offline machine learning model component on the cloud allows it to perform the heavy computations of the massive data existing in the cloud storage.

For example, if a safety interlock of a specific vessel overflow is designed in the interlocking logic to monitor the vessel level and close its inlet as a response action, but it also has some recurrent accepted recommendation records on another suggested root cause like a preceding pump speed issue, then the offline machine learning model recommend adding the preceding pump speed as an additional cause element in the interlock design. Eventually, improving the interlocking logic gets mirrored on the robustness of the process safety that it controls.

Consequently, an improved safety interlock recommendation system is provided.

In a preferred embodiment, the cloud application unit is configured for determining the long-term engineering recommendation and/or the long-time operational recommendation using the provided storage data.

Preferably, the association mining and root cause analysis used in the offline machine learning model resulted from training a ML algorithm on the cloud storages, for example repositories of operational data, safety incidents, and alarm events, I/O information, interlock design, etc. However, this is not the end of the training phase, but rather it's the first iteration, as the system aims at being a "continuous learner". To achieve this, the system maintains a log for its overtime produced recommendations, from both the operational and re-engineering components, and the offline feedback from the human operator on them, for example decisions of either accepting, rejecting, or editing the ML recommendations. Such a log could then be used to re-train the ML algorithms and update the offline machine learning model to improve the quality of the offline analysis data and the long-term operational recommendation and the re-engineering recommendation. This automated reuse of acquired human knowledge contributes to the continuous improvement of internal plant processes in their context.

In a preferred embodiment, the edge device is configured for receiving online user feedback on a former short-term recommendation. The online machine learning model is configured to be retrained using the online user feedback.

In a preferred embodiment, the cloud storage is configured for receiving offline user feedback on a former long-term operational recommendation and/or former re-engineering recommendation. The offline machine learning model is configured to be retrained using the offline user feedback.

In a preferred embodiment, the online machine learning model and/or the offline machine learning model uses Bayesian Networks.

To perform root cause analysis adequately it is important to decide what data elements to include in the analysis, and there are two major techniques that can be used. The first is Raw Data Analysis, which use the collected data holistically, and the second is the Feature-based approach, in which relevant data elements are selected as single observations. Looking at the classical statistical approaches for association mining and root cause analysis, they are found ineffective for low-frequency interlocking situation as there are typically few records in the static log database. Similarly, using Decision Tree Learning, which has good interpretation of the decision, i.e., specific tree leaf, along the leading observations, or in other words tree nodes, is not feasible as it requires a big data set for training and testing the model. On the contrast, Bayesian Decision Theory, BDT, implemented for example using Bayesian Networks, excels in such a scenario. BDT quantifies the tradeoffs among various classifications, i.e., regular normal situation and different undesired interlocking situations, using probability and risk of observed patterns. These patterns are identified as deviations in the values of data elements between regular and interlocking situations, e.g., deviation in amplitude, period, or synchronization phase of a signal. An advantage of the BDT is that it allows incremental evaluation of data as it becomes available and requires no a priori information regarding process variables or the types of anomalies that may be encountered. That is, it updates the probability for the predicted interlocks as more evidence, i.e., interlocking records, becomes available, so it does not require starting with a data set with many frequent records per interlock. Hence, building the prediction model using a Bayesian algorithm would better suit forecasting the safety interlocks, their relevant causes, involved equipment, and their consequences. To validate the model and check its prediction accuracy, a cross-validation technique should be used. Furthermore, it would be useful to utilize the Extreme Value Theory to model outlier rare interlocks by formulating distributions for interlock situations over a threshold value.

Often, it is inevitable to keep the human expert in the loop. Although it is aimed at automating the root cause analysis in order to reduce the dependency on expert knowledge, it is critical to keep the valuable on-site experts to monitor, validate, manage the root cause analysis process, and ensure considering all relevant parameters. Hence, it is vital for the human expert in the loop either being the "safety interlock designer" or the "human operator" to have deep understanding of the hazards and risks related to the interlocked process and its instruments. It is also critical for them to have profound decision-making skills as they affect the process safety on the short and long term. Additionally, like all ML-based solutions data quality is a key success factor, so it should be properly maintained with consistency being considered among the different input source According to another aspect of the invention, a method for recommending a safety interlock comprises the step: Providing by a process data source, stream data to an edge device, wherein the edge device comprises an operational technology unit, OT unit, and a stream analysis unit. The method further comprises the step: Providing, by an edge device unit comprising an operational technology edge application unit, OT edge application unit, and a stream analysis unit, operation technology stream data, OT stream data. The method further comprises the step: executing, by an online machine learning model of the stream analysis unit, an explorative analysis using the provided stream data and the provided OT data by executing an explorative analysis, thereby determining online analysis data. The method further comprises the step: Determining a short-term recommendation using the online analysis data.

Consequently, the method can be accommodated to run on existing hardware infrastructure and/or virtualized, requiring minimal or no extra hardware cost.

According to another aspect of the invention, a computer program is provided, comprising instructions which, when the program is executed by a computer, cause the computer to carry out the method for recommending a safety interlock, as described herein.

Preferably, a simulation feature is allowed within the safety interlock recommendation system, in which the user can change the values of some process-safety-related parameters in order to see the change effect before actually performing it on the operating process. For example, the user could test changes on the operational level by examining how the safety prediction would look like when a specific valve is opened or closed. This could also apply to test the changes on the design level, by simulating the effect of changing an existing interlock design or adding a completely new interlock.

Although the system targets the safety interlocks it could apply to process interlocks in order to enhance the process performance and not only its safety, given that there are much more available data for process interlocking events and their triggering process variables compared to the safety interlocking events. Thus the system can assist in identifying and resolving poor automation performance, e.g. instabilities, poor process operation, e.g. working too close to limit conditions, poor interlock design and even poor process design. On the operational level, for example, it is of help for the operator to know about the approachability of process interlocks. For example, to know that a process interlock is about to stop a pump as it feeding fluid tank is running empty, in this case of course help predicting that this condition could occur is valuable because the pump stopping will stop or slow down the downstream process. Preferably, costs of the triggering the process interlocks based on history information of process interruptions and shutdowns are known. Preferably, the applications like a dashboard and simulation features for operators and process engineers can be of great assistance to improve the process performance proactively.

Further preferably, the machine learning based recommendations are combined both on the operational and engineering levels with "technical explanation" on how the model reached such recommendation results. For example, if the model is built using a Decision Tree algorithm, it could simply present path it took to reach a specific recommendation. This could be implemented through the existing Explainable AI libraries, e.g., ELI5, Shap, etc. However, the given AI explanation could get very complex and hard to interpret for other advanced ML algorithms like the Neural Networks. Hence, it could be hard to interpret them by human operators or interlock engineers. To sum up, the current state of these Explainable AI libraries mainly helps data scientist in understanding the ML model behavior, but there are ongoing and extensive research and efforts being performed to extend the explanations to offer the end-user level of interpretations.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A safety interlock recommendation system, comprising:

at least one process data source, an edge device, wherein the process data source is configured for providing process stream data to the edge device;

wherein the process stream data includes real-time operational data;

wherein the edge device comprises an operational technology edge application unit, OT edge application unit, and a stream analysis unit;

wherein the OT edge application unit is configured for providing operation technology stream data, OT stream data;

wherein the OT stream data comprises safety-relevant data from the OT application unit;

wherein the stream analysis unit comprises an online machine learning model, being configured for determining online analysis data using stream data comprising the provided process stream data and the provided OT stream data;

wherein the OT edge application unit is configured for determining a short-term recommendation for proactive actions including adjusting control parameters of components in the process data source to avoid potential safety interlock events using the online analysis data;

wherein the online machine learning model is configured for executing an online explorative analysis to determine the online analysis data;

wherein the online explorative analysis comprises association mining and root cause analysis;

wherein association mining comprises detecting operational patterns in the stream data; and wherein the root cause analysis comprises detecting a root cause in the stream data for a potential safety interlock event.

2. The system of claim 1, wherein the stream data comprises dynamic time-series data directly relating to a controlled process of the industrial plant.

3. The system of claim 1, further comprising a cloud platform, wherein the edge device is configured for determining batch data using stored stream data; wherein the cloud platform comprises a batch analysis unit and a cloud application unit; wherein the batch analysis unit comprises an offline machine learning model configured for determining offline analysis data using the batch data; wherein the cloud application unit is configured for determining a long-term operational recommendation using the offline analysis data.

4. The system of claim 3, wherein the offline machine learning model executes an offline explorative analysis to determine the offline analysis data; wherein the offline explorative analysis comprises association mining and root cause analysis.

5. The system of claim 3, wherein association mining comprises detecting operational patterns in the batch data and wherein the root cause analysis comprises detecting a root cause in the batch data for a potential safety interlock event.

6. The system of claim 3, wherein the cloud platform comprises cloud storage, wherein the cloud storage is configured for providing storage data to the batch analysis unit; wherein the storage data comprises additional stored data relating to the safety interlock recommendation system; and wherein the offline machine learning model is configured for determining the offline analysis data using the provided storage data.

7. The system of claim 3, wherein the cloud application unit is configured for determining a re-engineering recommendation using the offline analysis data; wherein the re-engineering recommendation comprises potential design enhancement for an existing interlocking logic.

8. The system of claim 3, wherein the cloud application unit is configured for determining the long-term engineering recommendation and/or the long-time operational recommendation using the provided storage data.

9. The system of claim 3, wherein the cloud storage is configured for receiving offline user feedback on a former long-term operational recommendation and/or former re-engineering recommendation; and wherein the offline machine learning model is configured to be retrained using the offline user feedback.

10. The system of claim 1, wherein the edge device is configured for receiving online user feedback on a former short-term recommendation; and wherein the online machine learning model is configured to be retrained using the online user feedback.

11. The system of claim 1, wherein the online machine learning model and/or the offline machine learning model uses Bayesian Networks.

12. A method for recommending a safety interlock, comprising:
    providing, by a process data source, process stream data to an edge device, wherein the process stream data includes real-time operational data;

wherein the edge device comprises an operational technology edge application unit, OT edge application unit, and a stream analysis unit;

providing, by the OT edge application unit operation technology stream data, OT stream data, wherein the OT stream data comprises safety-relevant data from the OT application unit;

determining, by an online machine learning model of the stream analysis unit, online analysis data using stream data comprising the provided process stream data and the provided OT stream data by executing an explorative analysis, thereby determining online analysis data;

determining a short-term recommendation for proactive actions including adjusting control parameters of components in the process data source to avoid potential safety interlock events using the online analysis data;

wherein determining by the online machine learning model online analysis data comprises executing an online explorative analysis to determine the online analysis data;

wherein the online explorative analysis comprises association mining and root cause analysis;

wherein association mining comprises detecting operational patterns in the stream data;

wherein the short-term recommendation provides proactive recommendations for a user to drive away from the undesired process downtime effect;

and wherein the root cause analysis comprises detecting a root cause in the stream data for a potential safety interlock event.

13. The method of claim 12, wherein the stream data comprises dynamic time-series data directly relating to a controlled process of the industrial plant.

14. The method of claim 12, further comprising a cloud platform, wherein the edge device is configured for determining batch data using stored stream data; wherein the cloud platform comprises a batch analysis unit and a cloud application unit; wherein the batch analysis unit comprises an offline machine learning model configured for determining offline analysis data using the batch data; wherein the cloud application unit is configured for determining a long-term operational recommendation using the offline analysis data.

* * * * *